US007102797B2

(12) United States Patent
Sakai

(10) Patent No.: US 7,102,797 B2
(45) Date of Patent: Sep. 5, 2006

(54) IMAGE READING DEVICE AND IMAGE FORMING APPARATUS INCLUDING THE IMAGE READING DEVICE

(75) Inventor: Yoshihiro Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 911 days.

(21) Appl. No.: 10/150,932

(22) Filed: May 21, 2002

(65) Prior Publication Data

US 2002/0186426 A1 Dec. 12, 2002

(30) Foreign Application Priority Data

May 21, 2001 (JP) ............................ 2001-150446

(51) Int. Cl.
*H04N 1/00* (2006.01)
*H04N 1/40* (2006.01)
*H04N 1/04* (2006.01)
*G06K 9/40* (2006.01)

(52) U.S. Cl. ...................... 358/461; 358/406; 358/474; 382/274

(58) Field of Classification Search ................ 358/461, 358/406, 474, 496, 497, 486; 382/274
See application file for complete search history.

(56) References Cited

U.S. PATENT DOCUMENTS 5,124,810 A 6/1992 Seto
5,744,929 A 4/1998 Miyazaki
5,970,181 A * 10/1999 Ohtsu ......................... 382/274

* cited by examiner

*Primary Examiner*—Jerome Grant
*Assistant Examiner*—Houshang Safaipour
(74) *Attorney, Agent, or Firm*—Oblon, Spivak, McClelland, Maier & Neustadt, P.C.

(57) ABSTRACT

In an image reading device having a sheet-through mechanism, a controller controls a stepping motor to decelerate an image reading system when the image reading system is moved to a reference white plate reading position, and controls a stepping motor drive electric current to decrease when the image reading system reads a reference white plate. When the image reading system finishes reading the reference white plate, the controller controls the stepping motor drive electric current to increase so as to rapidly decelerate the image reading system. The controller further controls the stepping motor such that a moving speed of the image reading system to an original document reading position is lower than a moving speed of the image reading system to the reference white plate reading position.

18 Claims, 6 Drawing Sheets

30
22
13
14
FORWARD DIRECTION
RETURN DIRECTION
IMAGE READING POSITION IN IMAGE READING SYSTEM MOVING MODE
15
1
IMAGE READING POSITION IN SHEET-THROUGH MODE
V
VELOCITY
FORWARD DIRECTION
TIME
RETURN DIRECTION
V

IMAGE READING DEVICE AND IMAGE FORMING APPARATUS INCLUDING THE IMAGE READING DEVICE

CROSS REFERENCE TO RELATED APPLICATIONS

This application contains subject matter related to and claims priority, under 35 U.S.C. §119, from Japanese Patent Application No. 2001-150446, filed in the Japanese Patent Office on May 21, 2001, the entire disclosure of which is hereby incorporated by reference herein.

BACKGROUND OF THE INVENTION

1. Field of the Invention

The present invention generally relates to an image reading device that reads image data of an original document with an image sensor and an image forming apparatus, such as a digital copying machine, a laser beam printer, a facsimile machine, etc., that forms an image based on the image data output from the image reading device and more particularly, to a control of reading operation of a reference white plate for obtaining shading data in the image reading device having a sheet-through mechanism.

2. Discussion of Background

An image reading device used in a widespread digital copying machine, a scanner, or other similar image forming apparatus, may employ a method of reading an image of an original document by a two-dimensional scanning in which a charge-coupled device (CCD) line sensor is moved in a sub-scanning direction perpendicular to a main scanning line relatively to an original document illuminated by a lamp.

The image reading device employing such an image reading method in which the CCD line sensor is moved relatively to the original document, generally uses two types of image reading mechanisms. One type of image reading mechanism may be referred to as an image reading system moving mechanism in which an image of an original document set on an original document setting table (e.g., a contact glass) in a stationary state is read by moving an image reading system. Another type of image reading mechanism may be referred to as a sheet-through mechanism in which an original document is fed by an original document feeding device (hereinafter simply referred to as a "document feeder") so as to pass through a stationary image reading system including a CCD line sensor. An image of an original document is read by the stationary image reading system while moving the original document relative to the image reading system.

Recently, an image reading device often has both of the above-described two types of image reading mechanisms. Hereinafter, a description will be made to an image reading device that reads an image of an original document by both of the two types of image reading mechanisms.

The image reading device having both of the two types of image reading mechanisms reads an image of an original document by a common image reading system. When performing an image reading operation in the sheet-through mechanism, the image reading operation is performed in a condition that a movable image reading system is held stationary at a predetermined image reading position provided at a part of an original document conveying path in a document feeder. In the image reading device having both of the two types of image reading mechanisms, it is not desirable that an output of image read by the image reading system moving mechanism is different from that of image read by the sheet-through mechanism or an output of image read by either of the two image reading mechanisms changes with time. Therefore, in order to stabilize outputs of read images, an image reading system reads a reference white plate before reading an image of an original document to obtain a reference white level or shading data based on the data of read reference white plate. A white level of image data of a read original document is corrected using the shading data.

In the image reading system moving mechanism, following a reading operation of a reference white plate arranged between a home position of an image reading system and a position where an original document is set on a contact glass, an image reading operation of the original document is performed.

In the sheet-through mechanism, as described above, an image reading system reads an image of a moving original document fed by a document feeder in a condition that the image reading system is held stationary at a predetermined image reading position. Therefore, when reading the same reference white plate also used in the image reading system moving mechanism, the image reading system needs to be moved to the position where the reference white plate is arranged. This results in adding a step of moving the image reading system contrary to the aim of eliminating the necessity of moving the image reading system in the sheet-through mechanism. Accordingly, in order not to reduce the advantage of high throughput in the sheet-through mechanism allowing an image reading device to read original documents consecutively, it may be desired to reduce a whole period of time required for performing the reading operation of the reference white plate as much as possible.

In the above-described image reading device, a carriage carrying the image reading system is driven to move by a stepping motor. Generally, an image reading operation is controlled to be performed when the movement of the carriage changes to a constant velocity movement after being accelerated from a stop position of the carriage. Subsequently, the movement of the carriage is controlled to be decelerated after the image reading operation. Such a control operation is performed in both of an image reading operation of an original document and a reading operation of a reference white plate.

FIG. 7 is a velocity chart illustrating a control of movement of a carriage and a control of reading operation of a reference white plate according to a background art. With regard to a timing of reading a reference white plate according to a background art, a reading operation of the reference white plate is performed in an area indicated by a reference character "A" in FIG. 7 in which the carriage moves at a constant velocity and vibrations of an image reading system carried by the carriage are the weakest after the carriage is driven to move by a stepping motor and is accelerated. Alternatively, in order to reduce a time of reading the reference white plate as much as possible, the reading operation of the reference white plate is performed in an area indicated by a reference character "B" in FIG. 7 in which the carriage is accelerated, with some disadvantages such as vibrations of the image reading system.

Recently, demands have been increasing for an image reading performance satisfying both high speed and high image quality such as an image reading speed of 40 sheets/minute and a resolution of 1200 dpi, for example, in a color image reading device. In such a color image reading device, if a reading operation of a reference white plate is performed in the area "A" in FIG. 7, it takes time until vibrations of an image reading system become weak, and a start of the reading operation is delayed, thereby increasing a whole period of time required for performing the reading operation.

If the reading operation of the reference white plate is performed in the area "B" in FIG. 7, the reading operation can be started earlier than in the area "A". However, there may be a high possibility of occurrence of error in data of the read reference white plate due to the vibrations generated when the carriage is driven to move from a stop position. As a result, it may be hard to obtain appropriate shading data.

SUMMARY OF THE INVENTION

According to one aspect of the present invention, an image reading device includes an image reading system configured to read an image of an original document, a stepping motor configured to apply a drive force to the image reading system so as to move the image reading system, a controller configured to control the stepping motor to drive in accordance with speed patterns of the stepping motor set for each operation of acceleration, moving at constant velocity, and deceleration of the image reading system, an original document feeder configured to feed an original document to a predetermined original document reading position where the image reading system is held stationary to read an image of the original document fed by the original document feeder, and a reference white plate configured to be read by the image reading system at a reference white plate reading position spaced apart from the original document reading position in a moving direction of the image reading system before reading the image of the original document using the image reading system to form a read image so as to correct a white level of the read image of the original document. The controller controls the stepping motor to drive the image reading system to move to the reference white plate reading position for reading the reference white plate while moving, and then controls the stepping motor to decelerate the image reading system when the image reading system is moved to the reference white plate reading position.

Objects, features, and advantages of the present invention will become apparent from the following detailed description when read in conjunction with the accompanying drawings.

BRIEF DESCRIPTION OF THE DRAWING FIGURES

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
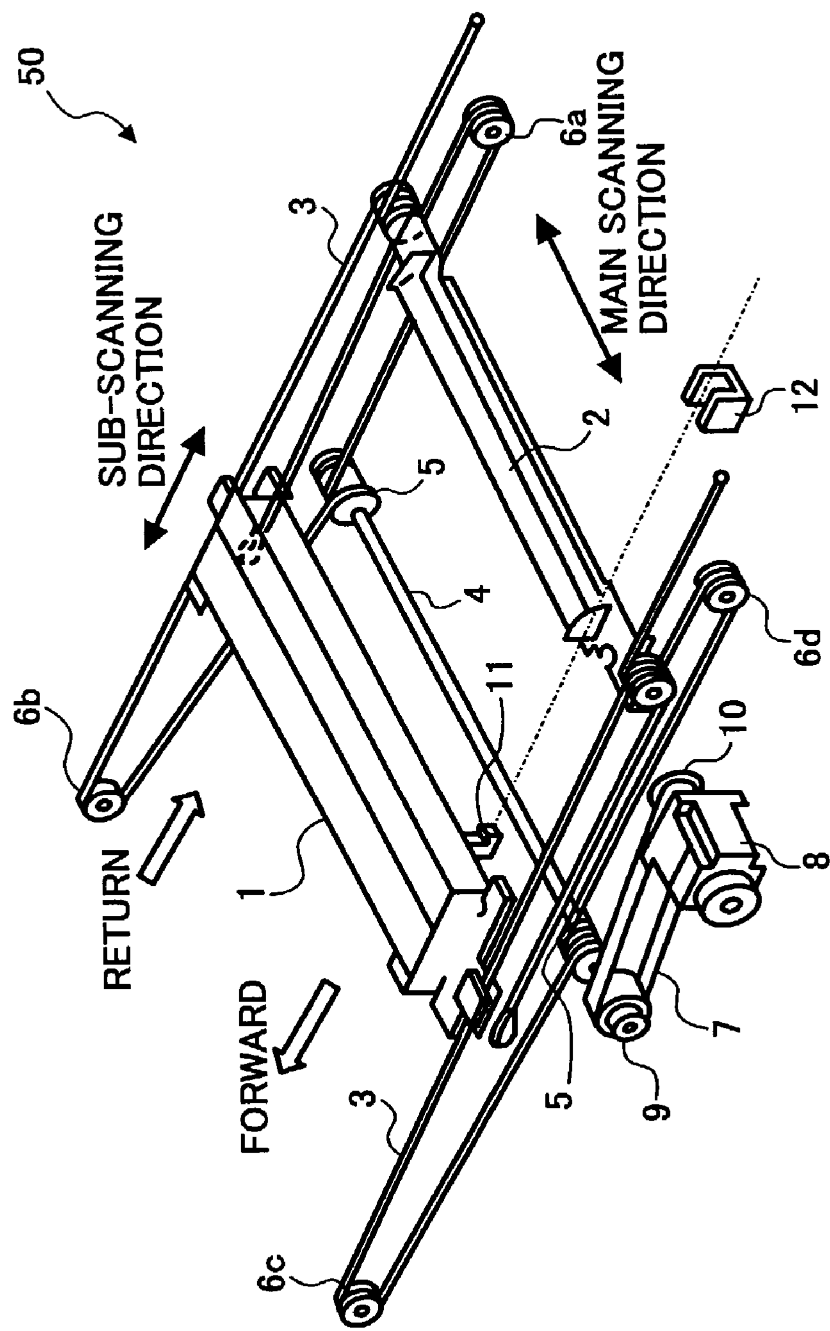
FIG. 1 is a schematic perspective view of a carriage driving system of an image reading device according to an embodiment of the present invention.

Preferred embodiments of the present invention are described in detail referring to the drawings, wherein like reference numerals designate identical or corresponding parts throughout the several views.

Figure 2:
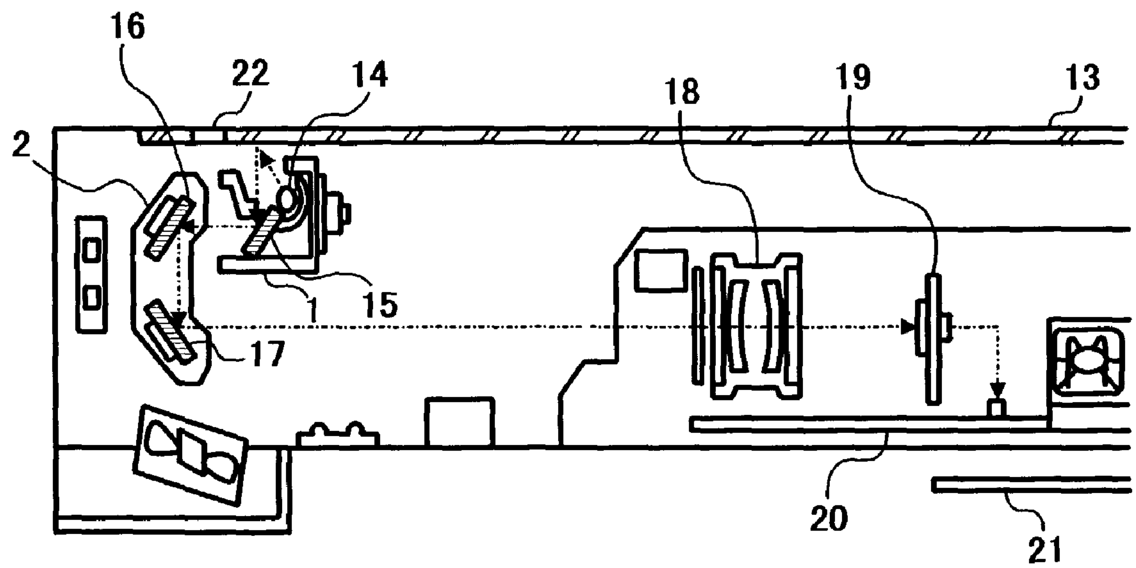
FIG. 2 is a side view of a part of the image reading device illustrating a schematic construction of an image reading system according to the embodiment of the present invention.

FIG. 1 is a schematic perspective view of a carriage driving system of an image reading device according to an embodiment of the present invention. FIG. 2 is a side view of a part of the image reading device illustrating a schematic construction of an image reading system.

Referring to FIGS. 1 and 2, an image reading device 50 includes a first carriage 1 that carries an exposure lamp 14 that irradiates an image surface of an original document with light and a first mirror 15 that reflects the light reflected from the image surface of the original document, and a second carriage 2 that carries a second mirror 16 and a third mirror 17 that reflect the light reflected from the first mirror 15. The light reflected from the third mirror 17, corresponding to the image of the original document, is imaged on a charge-coupled device 19 (hereinafter referred to as a CCD 19) serving as an image sensor through an imaging lens 18. In this embodiment, the first carriage 1 and the second carriage 2 and the above-described elements carried by the first and second carriages 1, 2 are defined as an "image reading system" as a whole.

Referring to FIG. 1, the image reading device 50 further includes a pair of wires 3, a drive shaft 4, a pair of wire pulleys 5 integrally provided on the drive shaft 4, idle pulleys 6*a*, 6*b*, 6*c*, and 6*d*, a timing belt 7, a stepping motor 8, timing belt pulleys 9 and 10, a detection part 11 provided on the first carriage 1, and a home position sensor 12 that detects the detection part 11 of the first carriage 1.

Referring further to FIG. 2, the image reading device 50 further includes a contact glass 13 serving as an original document setting table, a stepping motor drive control board 21 that controls the stepping motor 8 to drive, a scanner control board 20 that controls image processing and the stepping motor drive control board 21, and a reference white plate 22 used for obtaining shading data.

A brief description will be made to an operation of a carriage driving system referring to FIG. 1. The drive force of the stepping motor 8 is transmitted to the first carriage 1 and the second carriage 2 via the pair of wires 3 opposing each other and being extended at both respective sides of the first carriage 1 and the second carriage 2 in a main scanning direction indicated by arrow in FIG. 1. The wires 3 are driven by the pair of wire pulleys 5 integrally provided on both sides of the drive shaft 4 in the main scanning direction. The wire pulleys 5 are driven by the timing belt pulley 10 integrally provided on a shaft of the stepping motor 8 via the timing belt pulley 9 provided on one end of the drive shaft 4 and via the timing belt 7 spanned around the timing belt pulleys 9 and 10.

When turning on a power supply switch (not shown), in order to accurately locate the first carriage 1 and the second carriage 2 at respective home positions, the stepping motor 8 starts to drive the drive shaft 4. Then, the drive force of the stepping motor 8 is transmitted to the first carriage 1 and the second carriage 2 via the wires 3, thereby causing the first carriage 1 and the second carriage 2 to move in a forward direction indicated by the arrow in FIG. 1. After moving a predetermined distance in the forward direction, the first carriage 1 and the second carriage 2 start moving in a return direction indicated by arrow in FIG. 1. When the home position sensor 12 detects the detection part 11 provided on a lower part of the first carriage 1, the first carriage 1 and the second carriage 2 move further in the return direction by a predetermined distance corresponding to predetermined pulses, and stop moving at respective stopping positions. These respective stopping positions of the first carriage 1 and the second carriage 2 correspond to their home positions. The first carriage 1 and the second carriage 2 are in a standby condition at the respective home positions, and start reading operations from the respective home positions upon receiving a reading instruction.

In this embodiment, the image reading device 50 has two types of image reading mechanisms such as an image reading system moving mechanism and a sheet-through mechanism. Therefore, a document feeder 30 (illustrated in FIG. 5A) integrally formed with a platen plate (not shown) is provided above the contact glass 13 so as to cover and uncover the contact glass 13. The platen plate serves to cover an original document set on the contact glass 13 and press the original document against the surface of the contact glass 13.

The image reading device 50, according to the embodiment of the present invention, includes a construction similar to that of a background image reading device that reads an image of an original document by two types of image reading mechanisms. In FIG. 2, a construction of the image reading device 50 above the contact glass 13 is omitted, so that the document feeder 30 is not shown. The image reading device 50 having the two types of image reading mechanisms reads an image of an original document by use of a common image reading system. When performing an image reading operation in the sheet-through mechanism, the image reading operation is performed in a condition that a movable image reading system is held stationary at a predetermined image reading position provided at a part of an original document conveying path in the document feeder 30. The details of the image reading operation in the sheet-through mechanism will be described in more detail below referring to FIG. 5B.

Next, a description will be made of a control of the stepping motor 8 for driving the first carriage 1 and the second carriage 2.

Figure 3:
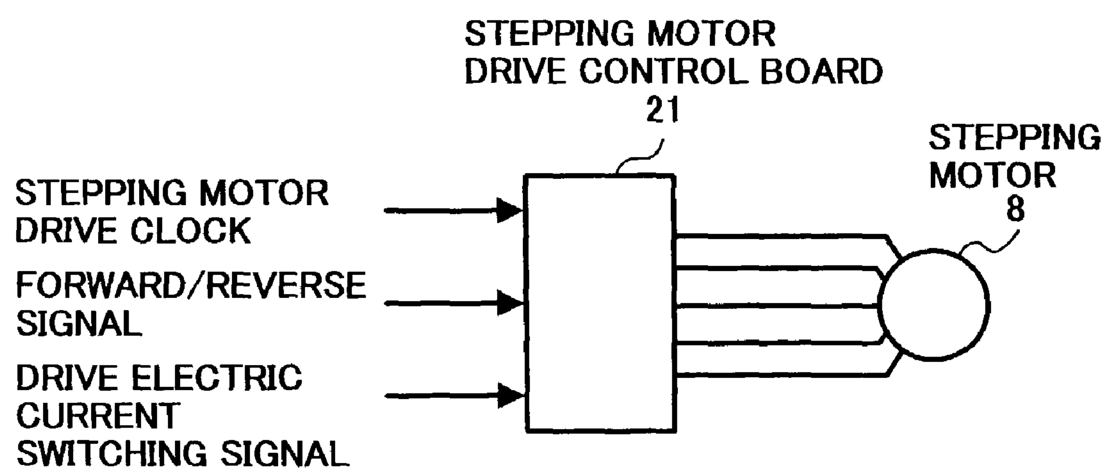
FIG. 3 is a block diagram illustrating a structure of a stepping motor drive control system in the image reading device according to the embodiment of the present invention.

FIG. 3 is a block diagram illustrating a structure of a stepping motor drive control system in the image reading device 50. The stepping motor 8 is controlled to be driven by the stepping motor drive control board 21. The scanner control board 20, including a central processing unit (CPU) that controls the whole image reading device 50, generates control signals, such as a stepping motor drive clock, forward/reverse signals, drive electric current switching signals, etc., based on control data, such as speed patterns of the stepping motor 8 set for each operation of the image reading system of the image reading device 50. The above-described control signals, such as the stepping motor drive clock, the forward/reverse signals, the drive electric current switching signals, etc., are input to the stepping motor drive control board 21. The stepping motor drive control board 21 controls the stepping motor 8 to drive by changing the drive electric current passing through each phase of the stepping motor 8 in accordance with the above-described control signals.

The speed of the stepping motor 8 is determined by the frequency of drive clock or the number of drive pulses per unit of time (pulse per second). The phase switching timing of the stepping motor 8 is controlled based on the frequency of drive clock. As the frequency of drive clock increases, the speed of the stepping motor 8 increases, and as the frequency of drive clock decreases, the speed of the stepping motor 8 decreases. Therefore, various kinds of acceleration and deceleration of the stepping motor 8 are achieved by controlling the frequency of drive clock. The drive electric current for the stepping motor 8 is controlled to be switched depending on the operations of the first and second carriages 1, 2, such as acceleration, deceleration, reading operation, return, wait, etc.

Figure 5A:
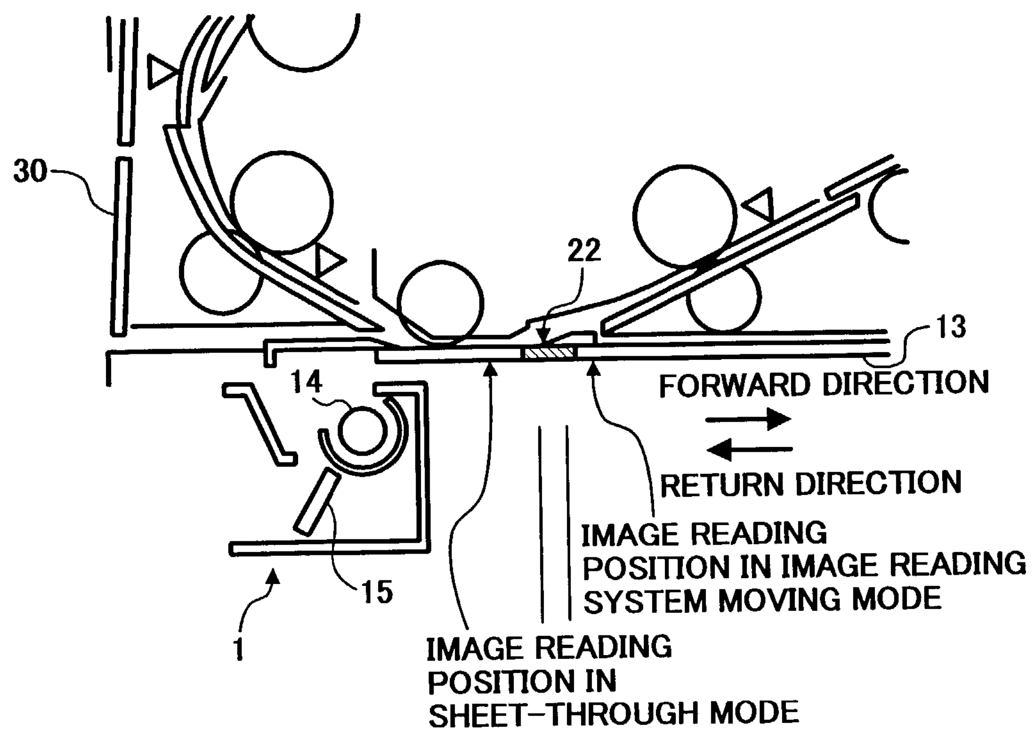
FIG. 5A is a schematic view of main elements of the image reading device according to the embodiment of the present invention.
Figure 5B:
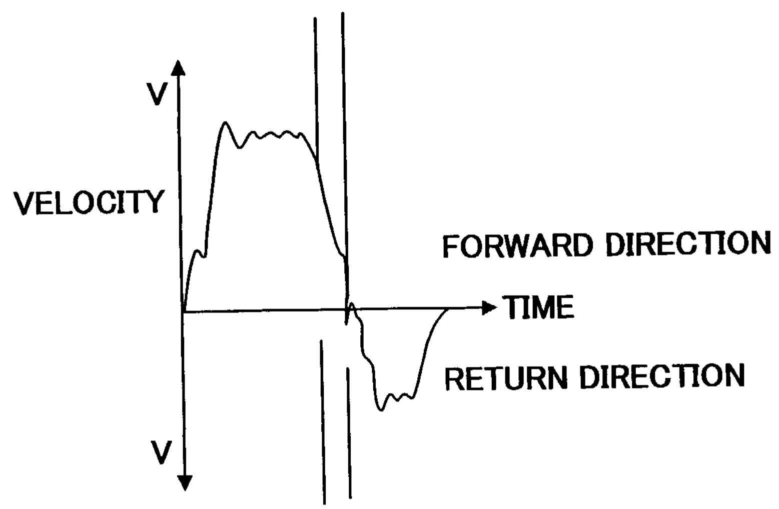
FIG. 5B is a velocity chart illustrating a movement control of the carriages in a sheet-through mode.
Figure 5C:
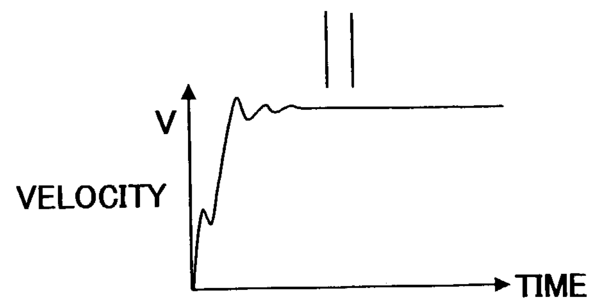
FIG. 5C is a velocity chart illustrating a movement control of the carriages in the image reading system moving mode.

Next, a description will be made of a drive control of the first carriage 1 and the second carriage 2 at the time of a reading operation of the image reading device 50. FIG. 5A is a schematic view of the main elements of the image reading device 50. FIG. 5B is a velocity chart illustrating a movement control of the carriage in a reading mode by the sheet-through mechanism. FIG. 5C is a velocity chart illustrating a movement control of the carriage in a reading mode by an image reading system moving mechanism.

Hereinafter, the reading mode by the sheet-through mechanism may be simply referred to as a "sheet-through mode", and the reading mode by the image reading system moving mechanism may be simply referred to as an "image reading system moving mode".

In this embodiment, the second carriage 2 moves together with the first carriage 1 in the sub-scanning direction at about one-half of the moving speed of the first carriage 1. Therefore, hereinafter, the drive control of the first carriage 1 and the second carriage 2 at the time of the reading operation of the image reading device 50 may be described referring to the first carriage 1 as a whole.

Referring to FIG. 5A, the first carriage 1 carrying the exposure lamp 14 and the first mirror 15 is in a standby condition at a home position. The first carriage 1 moves from the home position to three different reading positions. Specifically, the first reading position is located at a position most close to the home position of the three reading positions. Further, the first reading position is located in a part of an original document conveying path in the document feeder 30 provided above the contact glass 13. The first reading position is indicated as an "image reading position in a sheet-through mode" in FIG. 5A. At the first reading position, the first carriage 1 held in a stationary state reads an image of an original document being conveyed in the original document conveying path in the document feeder 30.

The second reading position is located at some midpoint of movement of the first carriage 1 in the forward direction indicated by the arrow in FIG. 5A from the home position. At the second reading position, the first carriage 1 reads the reference white plate 22 provided at a part of the contact glass 13 while moving.

The third reading position is located at a position farthest away from the home position in the forward direction. The third reading position is indicated as an "image reading position in an image reading system moving mode" in FIG. 5A. The third reading position corresponds to a reference position of an original document where a leading edge of an original document is set on the contact glass 13. At the third reading position, the first carriage 1 reads an image of an original document set on the contact glass 13 in a stationary condition while moving.

Figure 4:
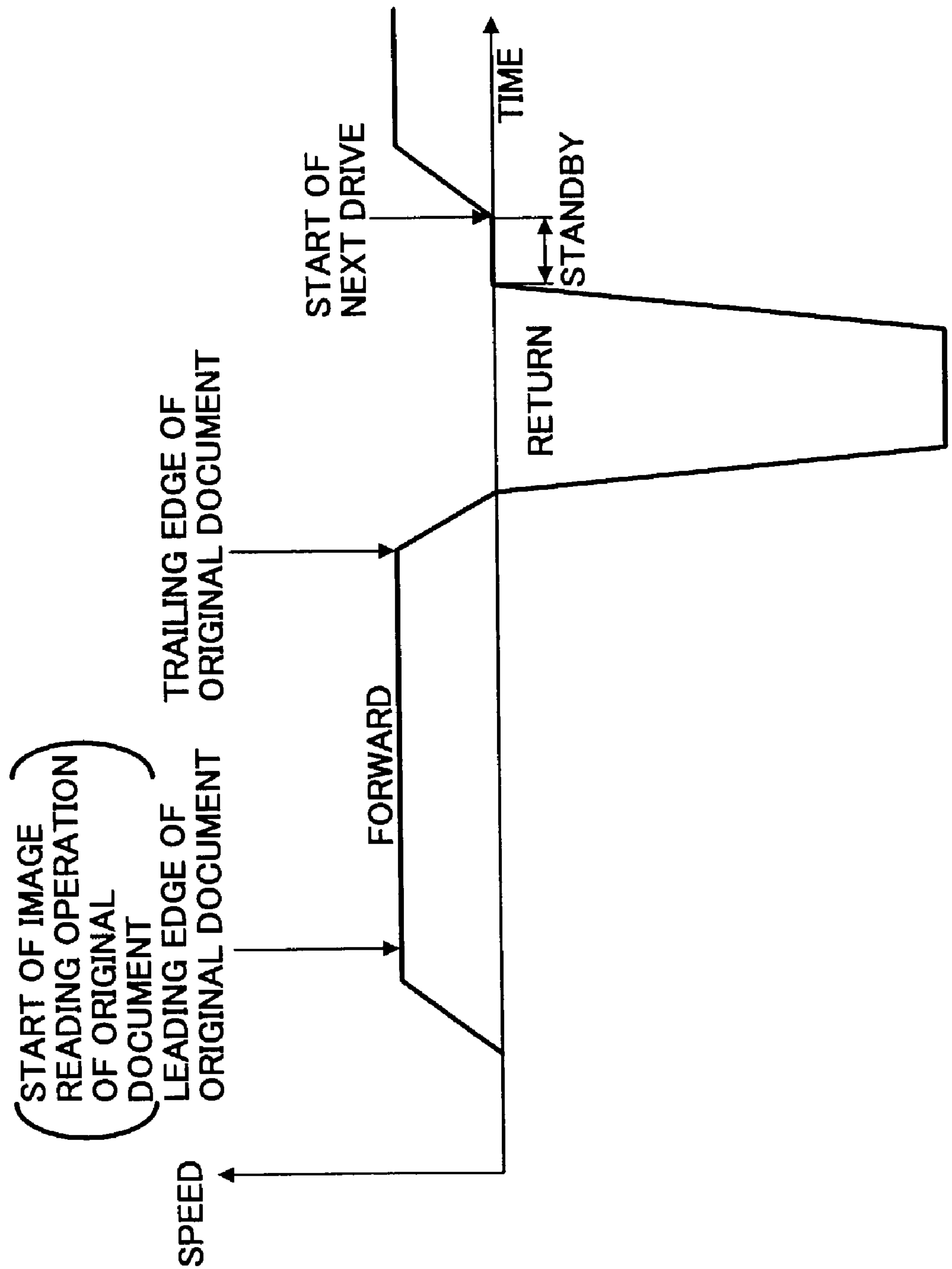
FIG. 4 is a chart illustrating an example of a speed pattern of a stepping motor for a movement control of carriages in an image reading system moving mode.

Hereinafter is described an operation of the image reading device 50 in an image reading system moving mode. When a start key (not shown) is pressed after setting an original document on the contact glass 13 and closing the platen plate, a drive clock is output from the scanner control board 20 to the stepping motor drive control board 21 at a predetermined timing, thereby driving the stepping motor 8. The drive controls of the first and second carriages 1, 2, are performed based on the speed patterns of the stepping motor 8 set for each operation of the image reading system of the image reading device 50. FIG. 4 is a chart illustrating an example of a speed pattern of the stepping motor 8 for the movement control of the first and second carriages 1, 2, in the image reading system moving mode.

As illustrated in FIG. 4, the stepping motor 8 causes the first carriage 1 to move from an accelerated condition to a constant velocity condition. Because the first carriage 1 reads an image of an original document from the leading edge (i.e., a reading start position) to the trailing edge in a constant velocity period, the velocity of the first carriage 1 should be stabilized in the constant velocity period. Before reading an image of an original document, the first carriage 1 needs to read the reference white plate 22 so as to obtain shading data.

The timing of reading the reference white plate 22 will be described referring to FIG. 5C. As illustrated in FIG. 5C, the first carriage 1 starts to move in the forward direction by driving the stepping motor 8, and moves from an accelerated condition to a constant velocity condition. The reading operation of the reference white plate 22 is performed in a stable constant velocity period after an unstable variable velocity period immediately after a velocity transitionary period. In the image reading system moving mode, an image reading operation of an original document is performed following the reading operation of the reference white plate 22. Therefore, the reading operation of the reference white plate 22 is also performed in a part of the stable constant velocity period for reading an image of an original document.

The reflected light from the reference white plate 22 is led to the CCD 19 through the imaging lens 18. The reflected light is converted into an electric signal by the CCD 19. The data of the reference white plate 22 obtained by the CCD 19 is transmitted to the scanner control board 20 and is subjected to image processing. Consequently, a reference white level or shading data is obtained.

Following the reading operation of the reference white plate 22, an image of an original document set on the contact glass 13 is read by the first carriage 1 and the second carriage 2 like the reference white plate 22. The data of the read image of the original document is transmitted to the scanner control board 20 and is subjected to image processing. At this time, a white level of image data of the read original document is corrected using the shading data obtained by reading the reference white plate 22. Thereby, an image output can be stabilized regardless of whether there are variations in image output levels caused by the decrease of the light amount of the exposure lamp 14 with time, etc.

Referring to FIG. 4, upon completion of image reading operation, the stepping motor 8 starts rotating in the reverse direction so as to return the first carriage 1 and the second carriage 2 to the respective home positions. In order to return the first carriage 1 and the second carriage 2 to their respective home positions, as much as possible, in the short time, the first carriage 1 and the second carriage 2 are moved in a high speed. As described above, the second carriage 2 moves in the sub-scanning direction at about one-half of the moving speed of the first carriage 1.

When the home position sensor 12 detects the detection part 11 provided on the lower part of the first carriage 1, the first carriage 1 and the second carriage 2 move by a predetermined distance corresponding to predetermined pulses, and the stepping motor 8 stops at the home position (i.e., the first and second carriages 1, 2 stop at their respective home positions). The stepping motor 8 waits at the home position until the stepping motor 8 is driven for a next image reading operation of the image reading device 50.

Next, an operation of the image reading device 50 in the sheet-through mode will be described.

Referring to FIGS. 5A and 5B, in the sheet-through mode, a stack of original documents are set on an original document tray (not shown) of the document feeder 30. Upon pressing the start key (not shown), the original document starts to be fed out from the original document tray by a group of rollers provided in the document feeder 30. Simultaneously, the drive clock is output from the scanner control board 20 to the stepping motor drive control board 21 at a predetermined timing so as to drive the stepping motor 8. Subsequently, the first carriage 1 and the second carriage 2 start moving in the forward direction from their respective home positions by driving the stepping motor 8. As illustrated in FIG. 5B, the first carriage 1 is accelerated to a predetermined velocity.

Immediately after the first carriage 1 is accelerated to a predetermined velocity, the motor drive electric current of the stepping motor 8 is decreased such that the first carriage 1 moves to a position where the reference white plate 22 is provided, thereby decelerating the first carriage 1.

That is, the deceleration of the first carriage 1 is started in a velocity transitionary period from an acceleration to a constant velocity period.

After a predetermined time has passed since the decrease of the motor drive electric current of the stepping motor 8, the vibrations of the first carriage 1 and the second carriage 2 decrease. That is, the friction loads of the first carriage 1 and the second carriage 2 function as a brake when the carriages are decelerated, thereby decreasing the load on the stepping motor 8. Therefore, if the motor drive electric current is decreased when reading the reference white plate 22, the vibrations of the first carriage 1 and the second carriage 2 decrease.

When the vibrations of the first carriage 1 and the second carriage 2 decrease, the reading operation of the reference white plate 22 is started. Due to the decrease of the vibrations of the first carriage 1 and the second carriage 2, the reference white plate reading operation can be performed stably. Specifically, the surface of the reference white plate 22 is irradiated with a light of the exposure lamp 14. The first mirror 15 reflects the light reflected from the surface of the reference white plate 22. Further, the second mirror 16 and the third mirror 17 sequentially reflect the light reflected from the first mirror 15. The light reflected from the third mirror 17 is led to the CCD 19 through the imaging lens 18, and the reflected light is converted into an electric signal by the CCD 19.

The data of the reference white plate 22 obtained by the CCD 19 is transmitted to the scanner control board 20 and is subjected to image processing. Consequently, a reference white level or shading data is obtained. The shading data is used for correcting a white level of image data of a read original document. By such a correction of the white level of image data of the read original document, an image output can be stabilized regardless of whether there are variations in image output levels caused by the decrease of the light amount of the exposure lamp 14 with time.

As illustrated in FIG. 5B, when the reading operation of the reference white plate 22 is completed, the first carriage 1 still moves in a decelerated condition. In order to stop the first carriage 1 and the second carriage 2 in the short time, the drive electric current for driving the stepping motor 8 is increased immediately after the completion of the reference white plate reading operation, and the first carriage 1 and the second carriage 2 are controlled to be rapidly decelerated and stopped. In this deceleration control operation, because the reference white plate reading operation is already completed, there is no serious influence even if the first carriage 1 and the second carriage 2 vibrate to some extent. Further, the first carriage 1 and the second carriage 2 can be stopped in the short time, so that the whole period of time required for performing the reading operation of the reference white plate 22 can be reduced.

Immediately after the first carriage 1 and the second carriage 2 have stopped, the first carriage 1 and the second carriage 2 are driven to move in the return direction indicated by the arrow in FIG. 5A. When the first carriage 1 moves to the "image reading position in the sheet-through mode," the first carriage 1 and the second carriage 2 stop moving. With regard to the return speed of the first carriage 1 toward the "image reading position in the sheet-through mode," in order to reduce the vibrations of the first carriage 1 as much as possible until the start of an image reading operation of an original document which is performed immediately after the stop of the first carriage 1, the first carriage 1 is driven to move at a lower speed than the moving speed of the first carriage 1 when the first carriage 1 moves to the reference white plate 22 for reading.

At the "image reading position in the sheet-through mode," an image of an original document fed out from the original document tray by a group of rollers provided in the document feeder 30 is read by the first carriage 1 and the second carriage 2. Similarly in the image reading system moving mode, the reflected light from the image surface of the original document is led to the CCD 19 through the imaging lens 18. The reflected light is converted into an electric signal by the CCD 19. The data of the read image of the original document obtained by the CCD 19 is transmitted to the scanner control board 20 and is subjected to image processing. At this time, a white level of image data of the read original document is corrected using the shading data obtained by reading the reference white plate 22. Thereby, an adequate image output can be obtained.

Because the image reading operation of the original document is performed in a condition that the vibrations of the first carriage 1 are reduced as much as possible, an inferior image reading at the tip portion of the image of the original document due to vibrations of the first carriage 1 is typically prevented. Therefore, an image of an original document can be read with accuracy in the image reading device 50.

As described above, in the image reading device 50 according to the embodiment of the present invention, the deceleration of the first carriage 1 is started in a velocity transitionary period from an acceleration to a constant velocity period, and the reading operation of the reference white plate 22 is performed in the decelerated condition of the first carriage 1. As compared to the reading operation of the reference white plate performed in the area "A" in FIG. 7 according to the background art, the reading operation of the reference white plate 22 starts earlier in the image reading device 50. As a result, the whole period of time required for performing the reading operation of the reference white plate can be reduced.

Figure 7:
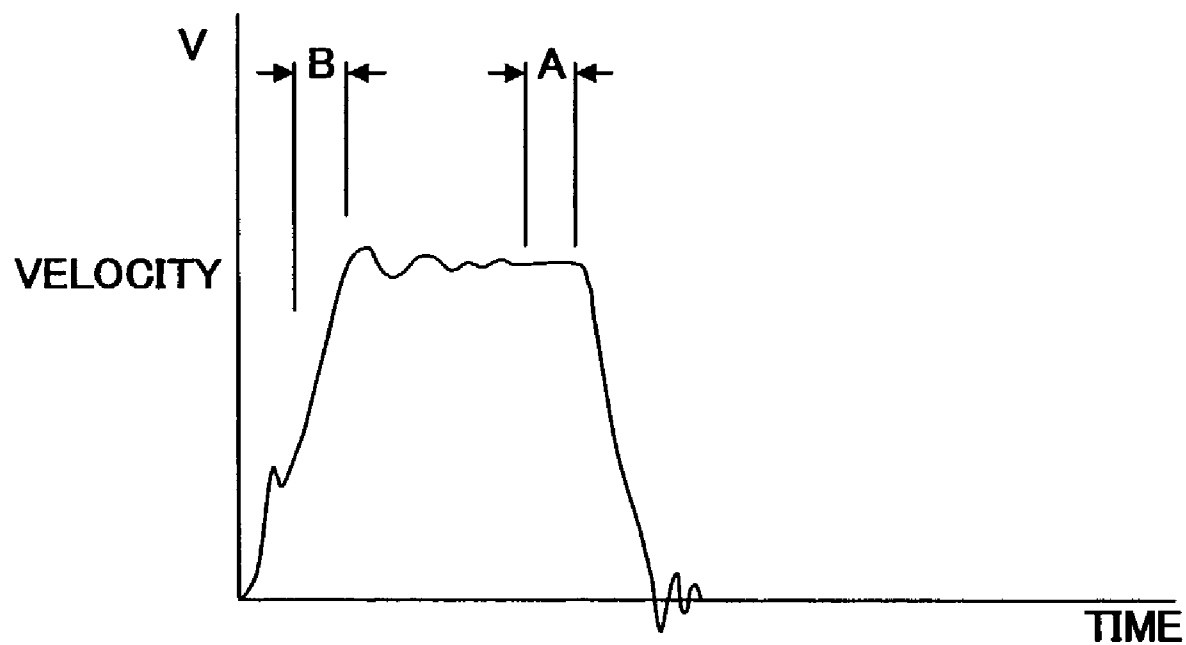
FIG. 7 is a velocity chart illustrating a control of movement of a carriage and a control of reading operation of a reference white plate according to a background art.

Further, as compared to the reading operation of the reference white plate performed in the area "B" in FIG. 7 in which the carriage is accelerated according to the background art, the reading operation of the reference white plate 22 can be performed stably in a decelerated condition in which vibrations of the carriage are less than those in an accelerated condition. Therefore, the reference white plate 22 can be read with accuracy in the image reading device 50.

Next, another embodiment of the present invention will be described referring to FIG. 6, in which the above-described image reading device 50 is used in an image forming apparatus, such as a copying machine.

Figure 6:
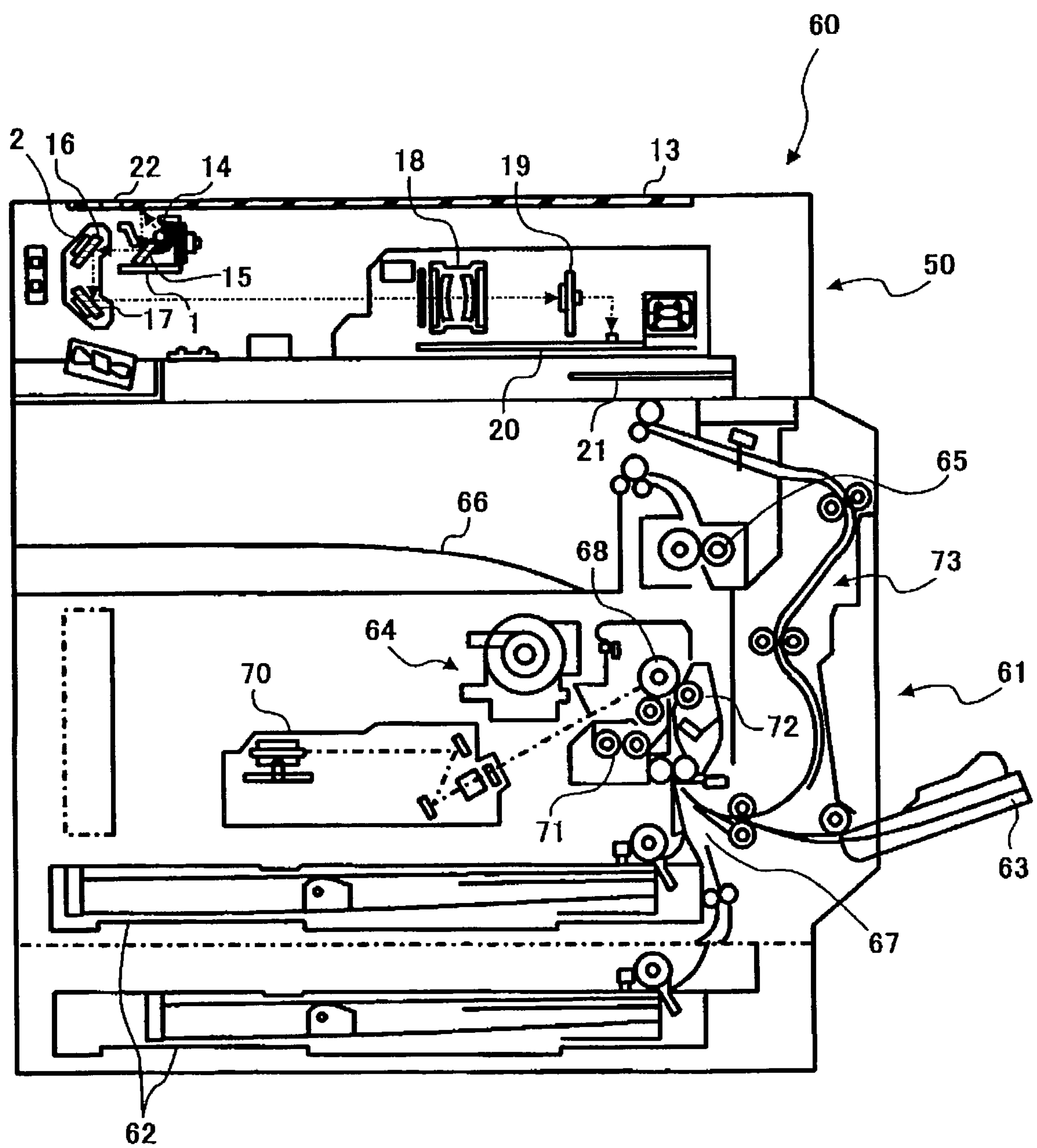
FIG. 6 is a schematic vertical longitudinal sectional side view of an image forming apparatus including the image reading device of FIG. 1 according to another embodiment of the present invention.

FIG. 6 is a schematic vertical longitudinal sectional side view of a copying machine according to another embodiment of the present invention. A copying machine 60 includes the above-described image reading device 50 serving as an image scanner at an upper part thereof, and a printer device 61 that forms an image of an original document read by the image reading device 50 on a sheet. In the printer device 61, a sheet is fed to an electrophotographic printer engine 64 through a sheet conveying path 67 from one of a sheet feeding tray 62 that accommodates a stack of sheets therein and a manual sheet feeding tray 63 that manually feeds sheets. The sheet fed to the electrophotographic printer engine 64 is further conveyed to a sheet discharging stacker section 66 via a fixing unit 65 through the sheet conveying path 67.

In this embodiment, the electrophotographic printer engine 64 includes an organic photoreceptor 68, and a charging device (not shown), an optical writing device 70, a developing device 71, and a transfer device 72 arranged around the photoreceptor 68. The printer device 61 further includes a sheet reversing mechanism 73 that reverses a sheet having an image on one side of the sheet.

An image is formed by the printer device 61 by an electrophotographic image forming process. A brief description will be made to an exemplary electrophotographic image forming process of the printer device 61.

The image data of an original document read by the image reading device 50 are sent to the printer device 61. The optical writing device 70 converts the image data from the image reading device 50 into optical signals, and exposes a surface of the photoreceptor 68 uniformly charged by the charging device with the optical signals to form an electrostatic latent image corresponding to the image of the original document. The electrostatic latent image on the photoreceptor 68 is developed with toner by the developing device 71.

A toner image on the photoreceptor 68 is transferred to a sheet fed from one of the sheet feeding trays 62 and the manual sheet feeding tray 63. Subsequently, the toner image on the sheet is fixed thereonto by the fixing device 65. The sheet having the toner image is discharged to the sheet discharging stacker section 66 as a copy print.

The image forming apparatus such as the copying machine 60 can achieve high performance such as high speed, high image quality, etc., by employing the above-described image reading device 50.

In the above embodiment of the present invention, the image reading device 50 is used in the copying machine 60 as an example of an image forming apparatus. Alternatively, the image reading device 50 may be used in other similar image forming apparatus, such as a facsimile machine.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An image reading device comprising:

an image reading system configured to read an image on a document;

a stepping motor configured to apply a drive force to the image reading system to move the image reading system;

a controller configured to control the stepping motor to drive in accordance with speed patterns of the stepping motor set for each operation of acceleration, moving at constant velocity, and deceleration of the image reading system;

a document feeder configured to feed the document to a predetermined document reading position where the image reading system is held stationary to read the image on the document fed by the document feeder; and a reference white plate configured to be read by the image reading system at a reference white plate reading position spaced apart from the document reading position in a moving direction of the image reading system before reading the image on the document using the image reading system to form a read image so as to correct a white level of the read image on the document, wherein the controller controls the stepping motor to drive the image reading system to move to the reference white plate reading position for reading the reference white plate while moving, and then controls the stepping motor to decelerate the image reading system when the image reading system is moved to the reference white plate reading position such that the image reading system reads the reference white plate only during the deceleration of the image reading system before reading the image on the document.

2. The image reading device according to claim 1, wherein the controller controls a stepping motor drive electric current to decrease when the image reading system reads the reference white plate.

3. The image reading device according to claim 1, wherein when the image reading system finishes reading the reference white plate, the controller controls a stepping motor drive electric current to increase so as to rapidly decelerate the image reading system.

4. The image reading device according to claim 1, wherein the controller controls the stepping motor to drive the image reading system to move to the document reading position for reading the image on the document fed by the document feeder after reading the reference white plate by the image reading system, and controls the stepping motor such that a moving speed of the image reading system to the document reading position is lower than a moving speed of the image reading system to the reference white plate reading position.

5. An image forming apparatus, comprising:

an image reading device including:

an image reading system configured to read an image on a document;

a stepping motor configured to apply a drive force to the image reading system to move the image reading system;

a controller configured to control the stepping motor to drive in accordance with speed patterns of the stepping motor set for each operation of acceleration, moving at constant velocity, and deceleration of the image reading system;

a document feeder configured to feed the document to a predetermined document reading position where the image reading system is held stationary to read the image on the document fed by the document feeder; and a reference white plate configured to be read by the image reading system at a reference white plate reading position spaced apart from the document reading position in a moving direction of the image reading system before reading the image on the document using the image reading system to form a read image so as to correct a white level of the read image on the document, wherein the controller controls the stepping motor to drive the image reading system to move to the reference white plate reading position for reading the reference white plate while moving, and then controls the stepping motor to decelerate the image reading system when the image reading system is moved to the reference white plate reading position such that the image reading system reads the reference white plate only during deceleration of the image reading system before reading the image on the document; and a printer device configured to print the image of the document read by the image reading device.

6. The image forming apparatus according to claim 5, wherein the controller controls a stepping motor drive electric current to decrease when the image reading system reads the reference white plate.

7. The image forming apparatus according to claim 5, wherein when the image reading system finishes reading the reference white plate, the controller controls a stepping motor drive electric current to increase so as to rapidly decelerate the image reading system.

8. The image forming apparatus according to claim 5, wherein the controller controls the stepping motor to drive the image reading system to move to the document reading position for reading the image on the document fed by the document feeder after reading the reference white plate by the image reading system, and controls the stepping motor such that a moving speed of the image reading system to the document reading position is lower than a moving speed of the image reading system to the reference white plate reading position.

9. An image reading device comprising:

reading means for reading an image on a document;

applying means for applying a drive force to the reading means to move the reading means;

controlling means for controlling the applying means to drive in accordance with speed patterns of the applying means set for each operation of acceleration, moving at constant velocity, and deceleration of the reading means;

feeding means for feeding the document to a predetermined document reading position where the reading means is held stationary to read the image on the document fed using the feeding means; and reference white plate means to be read by the reading means at a reference white plate means reading position spaced apart from the document reading position in a moving direction of the reading means before reading the image on the document by the reading means so as to correct a white level of the read image on the document;

wherein the controlling means controls the applying means to drive the reading means to move to the reference white plate means reading position for reading the reference white plate means while moving, and then controls the applying means to decelerate the reading means when the reading means is moved to the reference white plate means reading position such that the reading means reads the reference white plate means only during deceleration of the reading means before reading the image on the document.

10. The image reading device according to claim 9, wherein the controlling means controls a stepping motor drive electric current to decrease when the reading means reads the reference white plate means.

11. The image reading device according to claim 9, wherein when the reading means finishes reading the reference white plate means, the controlling means controls a stepping motor drive electric current to increase so as to rapidly decelerate the reading means.

12. The image reading device according to claim 9, wherein the controlling means controls the applying means to drive the reading means to move to the document reading position for reading the image the document fed by the feeding means after reading the reference white plate means by the reading means, and controls the applying means such that a moving speed of the reading means to the document reading position is lower than a moving speed of the reading means to the reference white plate means reading position.

13. An image reading method comprising:

moving an image reading system to a reference white plate reading position;

decelerating the image reading system when the image reading system is moved to the reference white plate reading position;

reading the reference white plate with the image reading system only during the deceleration of the image reading system;

moving the image reading system to a document reading position; and reading an image on a document using the image reading system after the reading of the reference white plate.

14. The image reading method according to claim 13, wherein the step of reading the reference white plate includes controlling a stepping motor drive electric current to decrease.

15. The image reading method according to claim 13, further comprising decelerating the image reading system rapidly by controlling a stepping motor drive electric current to increase when the image reading system finishes reading the reference white plate.

16. The image reading method according to claim 13, wherein the step of moving the image reading system to the document reading position includes moving the image reading system to the document reading position at a lower speed than moving the image reading system to the reference white plate reading position.

17. The image reading device according to claim 1, wherein the controller is configured to control the image reading system to read the reference white plate only during the moving of the image reading system at constant velocity, when the image is read on the document that is stationary.

18. The image reading device according to claim 1, wherein the controller is configured to control the image reading system to read the reference white plate only during the moving of the image reading system at constant velocity before the image is read on the document that is stationary.

* * * * *